United States Patent
Huang et al.

[11] Patent Number: 5,418,611
[45] Date of Patent: May 23, 1995

[54] MULTI-DEGREE-OF-FREEDOM GEOMETRIC ERROR MEASUREMENT SYSTEM

[76] Inventors: Peisen Huang, 2252 Cram Pl., Apt. 2; Jun Ni, 2755 Tuebingen, both of Ann Arbor, Mich. 48105

[21] Appl. No.: 77,302

[22] Filed: Jun. 14, 1993

Related U.S. Application Data

[63] Continuation-in-part of Ser. No. 857,380, Mar. 25, 1992, Pat. No. 5,220,397.

[51] Int. Cl.$^6$ ............................................. G01B 11/26
[52] U.S. Cl. ................................. 356/141.2; 356/141.3
[58] Field of Search ...................... 366/141, 152, 141.1, 366/141.2, 141.3, 141.5, 152.1

[56] References Cited

U.S. PATENT DOCUMENTS

| | | | |
|---|---|---|---|
| 4,844,618 | 7/1989 | Hamar | 356/400 |
| 4,988,193 | 1/1991 | Cain et al. | 356/152 |
| 5,108,167 | 4/1992 | Kandpal et al. | 385/33 |
| 5,195,155 | 3/1993 | Shimaoka et al. | 385/90 |
| 5,216,729 | 6/1993 | Berger et al. | 384/31 |
| 5,220,397 | 6/1993 | Huang et al. | 356/140 |
| 5,271,076 | 12/1993 | Ames | 385/26 |

*Primary Examiner*—Mark Hellner
*Attorney, Agent, or Firm*—James M. Deimen

[57] ABSTRACT

A high resolution, compact size and low cost multi-degree-of-freedom geometric error measurement system for simultaneously measuring four geometric errors, horizontal straightness, vertical straightness, pitch and yaw. The pitch and yaw error measurements are based on a new method of angle measurement in turn based on the internal reflection effect at an air/glass boundary. The method uses a differential detection scheme to largely reduce the inherent non-linearity of the reflectance versus the angle of incidence in internal reflection. With non-linearity reduced, the displacement of the angle of incidence can be determined accurately by measuring the reflectance. The resolution and measurement range are determined by the initial angle of incidence, the polarization state of light, and the number of reflections. Compared with interferometers and autocollimators, this method has the advantage of a simple sensor design for applications ranging from very wide measurement range to extremely high resolution. Apparatus for accomplishing the method comprises a beamsplitter, a pair of critical angle prisms and a pair of photodiodes. Each photodiode measures change in reflectance and with the application of suitable computation means produces an angle measurement of the beam incident to the beamsplitter. The horizontal and vertical straightness are based on a laser alignment technique utilizing a reference beam input through a single-mode fiber beam delivery system. The pointing stability of the beam is thereby significantly improved. As an illustrative example the system is applied to a machine tool slide.

3 Claims, 15 Drawing Sheets

FIGURE 22b
FIGURE 22a
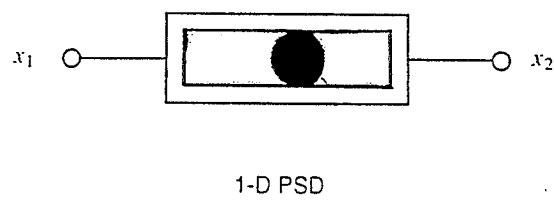
1-D PSD
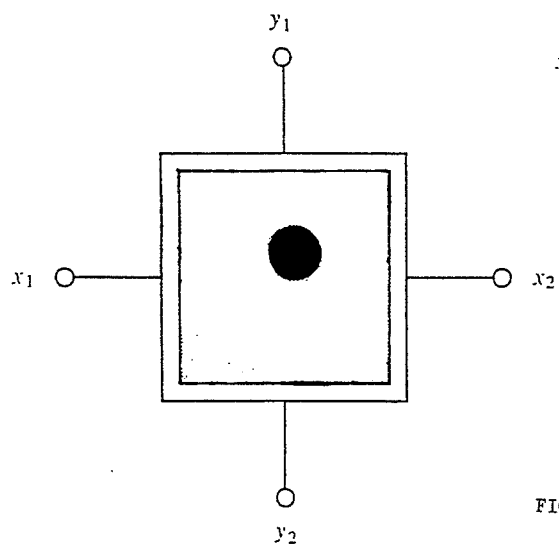
2-D PSD
FIGURE 23a
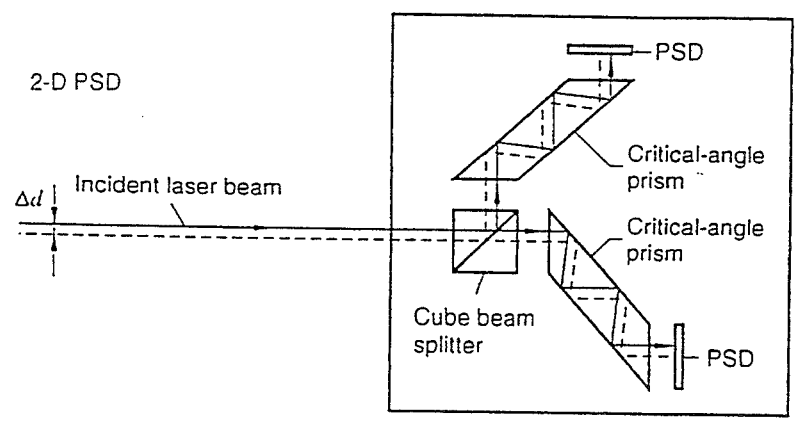
FIGURE 23b
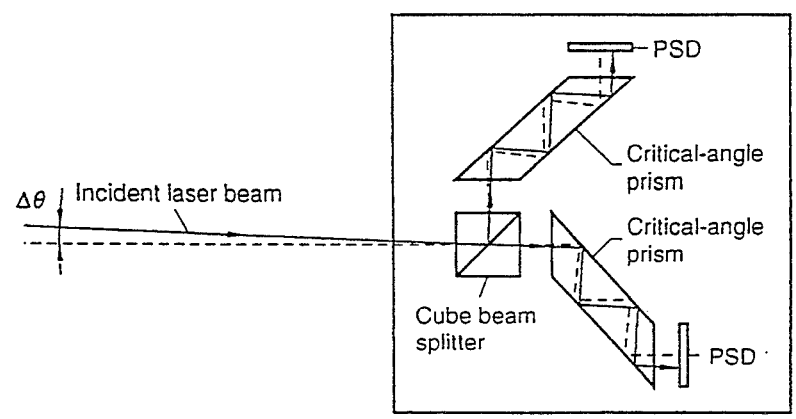

MULTI-DEGREE-OF-FREEDOM GEOMETRIC ERROR MEASUREMENT SYSTEM

This is a continuation-in-part of application Ser. No. 07/857,380, filed on Mar. 25, 1992, now U.S. Pat. No. 5,220,397.

BACKGROUND OF THE INVENTION

The field of the invention pertains to the optical measurement of angles and straightness for a variety of scientific and industrial purposes.

Optical measurement of angles is conventionally performed using either an interferometer or an autocollimator. Straightness errors are conventionally measured by dial gages and straightedges. More advanced methods use optical straightedges, laser interferometers or laser alignment techniques with quadrant diodes or position-sensing detectors (PSDs). The interferometer is based on the principle of interference of two laser beams which traverse slightly different optical paths whenever an angular displacement occurs. Various configurations have been developed and investigated for improving the accuracy and simplifying the structure. Among them, HP5528A interferometer measurement system from Hewlett-Packard Corporation is probably the most reliable and widely used instrument, especially in the calibration and accuracy maintenance of machine tools and Coordinate Measuring Machines (CMMs). But, this instrument only offers the capability of measuring one error component at a time.

An autocollimator measures an angular displacement by detecting the lateral displacement of a laser beam reflected from a mirror subjected to the angular displacement. Traditional autocollimators with manual operation have long been used for alignment. Their accuracy is usually around one second of arc. More recent laser opto-electronic autocollimators show higher accuracy and are used for surface profiling of optical elements, geometric error measurement of machine tools, and laser mirror servocontrols. Although both methods provide high resolution, devices based on these principles are usually large, making the devices hard to integrate with machines for on-line measurement.

However satisfying in measurement accuracy, almost all the systems measure only one or two error components at a time. This makes the calibration of an instrument or machine tool rather complicated and time consuming. Furthermore, if such measurements systems are used for actively controlling a linear-motion system, usually multiple separate measurement instruments need to be set up to measure all the error components simultaneously, which greatly complicates the system.

U.S. Pat. No. 4,390,781 discloses a method and apparatus for detecting the focussing error signal of an objective lens. The method and apparatus utilize a polarizing beamsplitter inserted between a collimating lens and an objective lens. The beamsplitter reflects light flux into a detection prism with a reflection surface and thereby to a light detector.

U.S. Pat. No. 4,505,584 discloses further improvements in the method and apparatus of the above patent comprising the application of specific thin films of alternating index of refraction to the prism. The result is improved sensitivity of the detector without appreciable increase in size of the prism.

U.S. Pat. No. 4,930,896 discloses a surface structure measuring apparatus that utilizes a focus detecting system with light deflectors conjugate to the pupil of an objective lens. Pertinent to the new method and apparatus described below is the apparatus shown in FIG. 3 wherein two prisms and two photo-detectors are used as a part of a surface measuring device. The three patents above, however, are generally directed to surface measurement as distinguished from angle measurement.

To make the calibration of instruments and machine tools more efficient and provide for possible real-time error compensation based on on-line measurement, the below disclosed system has been developed to measure multiple error components simultaneously.

SUMMARY OF THE INVENTION

The invention comprises a high resolution, compact size and low cost multi-degree-of-freedom geometric error measurement system for simultaneously measuring four geometric errors; horizontal straightness, vertical straightness, pitch and yaw. The pitch and yaw error measurements are based on a new method of angle measurement, namely angle measurement based on the internal reflection effect. This method utilizes the characteristics of internal reflection of a laser beam in the vicinity of the critical angle of an air/glass boundary. A differential detection scheme is used to largely reduce the inherent non-linearity of the reflectance versus the angle of incidence. Thus, the angular displacement of the laser beam can be accurately measured by the detection of the reflectance. Because of the nature of direct angular displacement measurement and the simple structure of the method, devices based on this principle are compact. A sensor which can measure small angular displacement up to 3 minutes of arc with a resolution of 0.02 seconds of arc has a physical size of only 50×50×25 mm and weighs only 70 g.

Another very important advantage of this method of angle measurement is that sensors for various applications, ranging from very wide range measurement to extremely high resolution measurement, can be designed by simply altering the sensor parameters, such as the initial angle of incidence, the polarization state, and the number of reflections of the laser beam. Because of these two major advantages over conventional methods, this new method is especially suitable for applications including cantilever deflection detection and control of Atomic Force Microscopes (AFMs), surface profiling of optical elements, vibration analysis, on-line geometric error measurement and compensation of machine tools and CMMs, laser pointing accuracy controls, and laser mirror servocontrols.

Although for wide range measurement or extremely high resolution measurement a polarized laser beam is preferable because parameters can be optimized for best performance, the new angle measurement method can be performed with non-polarized light. Moreover, the new method is not restricted to any particular wavelength of light and is applicable to both internal and external reflection at the boundary between materials of differing index of refraction. The theory is also correct for transmission measurement instead of reflection measurement.

For the simultaneous measurement of straightness the angle measurement system is modified by substituting position-sensing detectors (PSDs) for the detectors of the pure angle measurement system. As a result both position and intensity of an incident light beam on the detector can be measured and with suitable mathematical calculations the straightness error and angular error determined.

For a measurement system based on laser alignment techniques, the pointing stability of the laser beam is one of the main factors limiting the system accuracy. The physical position of the laser beam in space provides the sole measurement reference of the system. Any instability of the laser beam itself will be erroneously regarded as the signal output and therefore will cause measurement errors.

Unfortunately, all laser sources popularly used in measurement systems have such a problem to some extent because of the thermal deformation of their cavity mirrors. To solve this problem some laser sources utilize a beam expander to expand beam size by a certain ratio. By so doing, the angular pointing instability of the laser beam will be reduced by the same ratio. Although the pointing instability as indicated by lateral movement will be enlarged by the same ratio, this instability is either not important or compensable. Other methods choose to thermally stabilize the laser tube itself by circulating cooling water through a pipe wrapped on the laser tube. The beam expander method has its limitations in the degrees that the instability can be reduced because the beam size apparently can only be expanded to a certain degree. The cooling method makes the system rather complicated.

To find a better solution to the instability problem, a new approach uses a single-mode fiber optic beam delivery system to condition the laser beam. The single mode fiber is coupled at one end to a gas laser and at the other end directs the beam through a collimation lens to provide the exceptionally stable beam.

DESCRIPTION OF THE DRAWINGS

FIG. 1 illustrates the internal reflection of light beams at an air/glass interface;

FIG. 2 is a graph of reflectance of internal reflection at an air/glass interface;

FIG. 3 is a graph of reflectance and linearized reflectance;

FIG. 4 illustrates the principle of the differential detection method where prism 1 and prism 2 are identical;

FIG. 5 is a graph of linearized reflectances of s-polarized light for different initial reflectances where $R_{sO}$ is the initial reflectance of s-polarized light;

FIG. 6 is a graph of linearized reflectances of p-polarized light for different initial reflectances where $R_{pO}$ is the initial reflectance of p-polarized light;

FIG. 7 is a graph of sensitivity of the linearized reflectance;

FIG. 8 is a graph of non-linearity error of the linearized reflectance of s-polarized light where "Range" is the percentage of the total measurable range;

FIG. 9 is a graph of non-linearity error of the linearized reflectance of p-polarized light where "Range" is the percentage of the total measurable range;

FIG. 10 is a graph of residual error of the linearized reflectance of s-polarized light fit with a 3rd order polynomial;

FIG. 11 is a graph of residual error of the linearized reflectance of p-polarized light fit with a 3rd order polynomial;

FIG. 12 is a graph of linearized reflectances for multiple reflections;

FIG. 13 illustrates measurement error due to the angular displacement in the plane perpendicular to the plane of incidence;

FIG. 14 illustrates an optical schematic of a prototype sensor;

FIG. 15 is a graph of the characteristic curve of the prototype sensor;

FIG. 16 is a graph of the central part of the characteristic curve and its residual error of curve fitting;

FIG. 17 is a graph of the noise and drift of the new sensor;

FIGS. 22a and 22b illustrate position sensing detectors;

FIGS. 23a and 23b illustrate the optical layout for simultaneous measurement of straightness and angular errors;

DESCRIPTION OF THE PREFERRED EMBODIMENTS

Measurement Principle.

Figure 1:
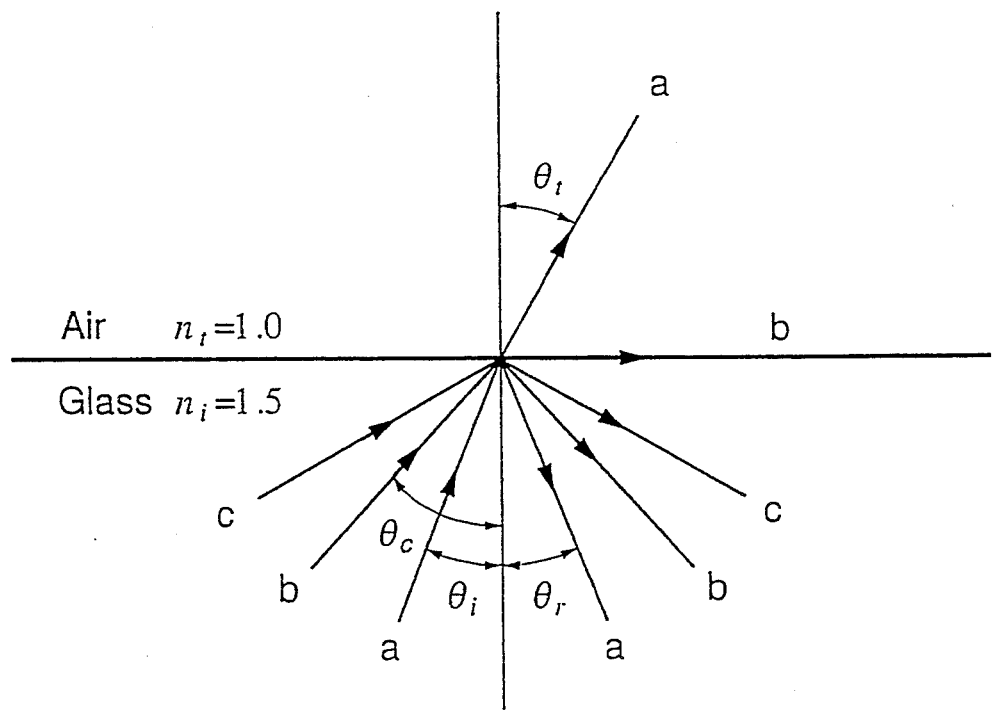
FIGS. 1 through 17 are directed to the angle measurement based on the internal reflection effect. The subsequent figures are directed to the complete error measurement system.

Whenever light impinges on the interface of two media, some of the light is reflected and some of the light is transmitted (undergoing refraction) into the second medium. FIG. 1 illustrates the internal reflection case in which light is incident from a higher index medium. (Glass $n_i=1.5$) to a lower index medium (Air $n_i=1.0$). The amplitude of the reflected light is a function of the ratio of the refractive index of the two materials, the polarization of the incident light, and the angle of incidence. Fresnel's laws of reflection precisely describe the amplitude and phase relationship between the reflected and the incident light. By thinking of incident radiation as the superposition of two linearly polarized beams, one with its electric field parallel to the plane of incidence (p-polarized) and the other with its electric field perpendicular to the plan of incidence (s-polarized), Fresnel's laws can be represented in the following two equations giving the reflectance of the s- and p-polarization components:

$$R_s = \left( \frac{\sin(\theta_i - \theta_t)}{\sin(\theta_i + \theta_t)} \right)^2 \quad (1)$$

$$R_p = \left( \frac{\tan(\theta_i - \theta_t)}{\tan(\theta_i + \theta_t)} \right)^2 \quad (2)$$

Where $\theta_i$ and $\theta_t$ are related by Snell's law:
$$n_i \sin \theta_i = n_t \sin \theta_t \quad (3)$$

Figure 2:
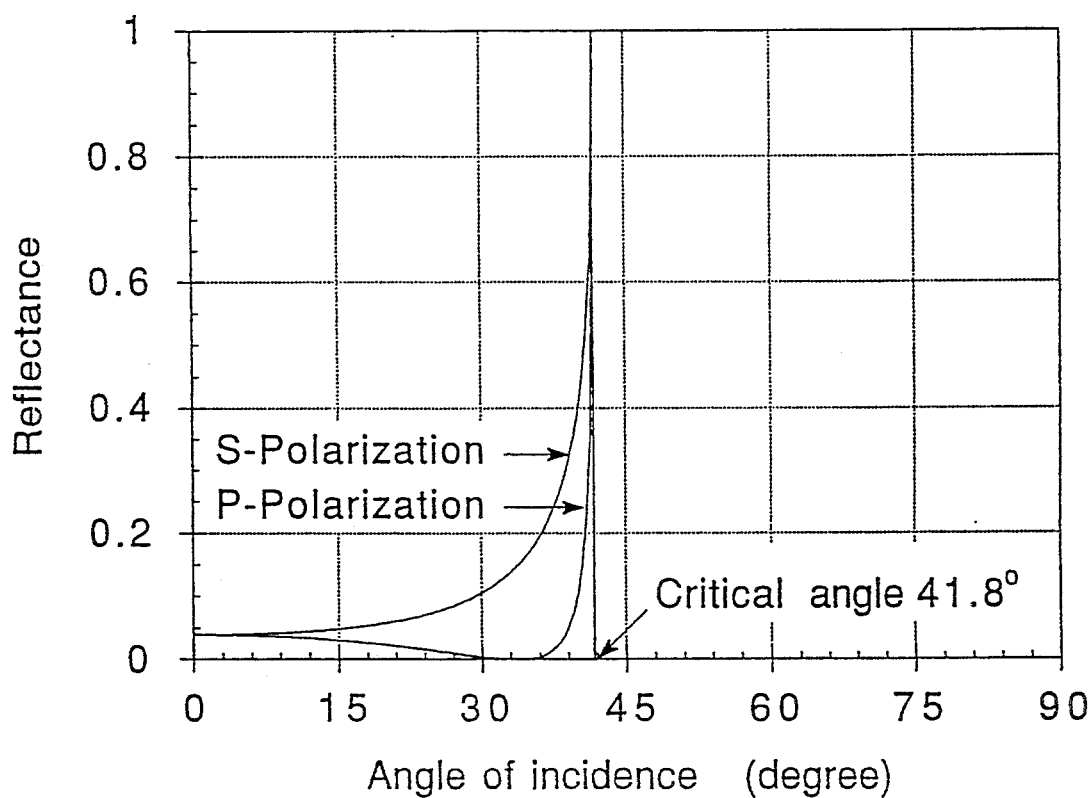

From Eq. (1) to Eq. (3), it is clear that reflectances $R_s$ and $R_p$ are functions of the angle of incidence $\theta_i$. FIG. 2 displays the curves of the reflectances $R_s$ and $R_p$ versus the angle of incidence $\theta_i$ for the internal reflection case shown in FIG. 1. As can be seen from this figure, in the case of internal reflection the reflectance of both s- and p-polarized beams undergoes a slow change for small angles of incidence but a sharp increase in the vicinity of the critical angle which is determined by the equation $\theta_c = \arcsin(n_t/n_i)$. The characteristics of reflectances $R_s$, and $R_p$ as functions of the angle of incidence $\theta_i$ can be used for angle measurement since reflectance or transmittance of the light beam can be easily detected using a photodiode or other photo-sensitive devices. When the incident beam lies in the vicinity of the critical angle this method provides high resolution. Unfortunately, the reflectance is inherently nonlinear with respect to the angle of incidence, which makes it difficult to be used for angle measurement.

To overcome the problem and make use of this characteristic in angle measurement, methods need to be developed to largely reduce this non-linearity. By both theoretical analysis and experimental results, it is found that a differential method can be applied to solve this problem. FIG. 2 shows that the reflectances change slowly when the angle of incidence is small and very fast in the vicinity of the critical angle. The slopes of the reflectances continuously increase as the angle of incidence increases up to the critical angle (for the reflectance of p-polarization, consider only the region where the angle of incidence is beyond the Brewster's angle). Therefore, if we can measure the angular displacement relative to an initial angle of incidence using both the low and high slope sides of the reflectance and then take the average of these two measured results, the non-linearity can be largely reduced. This heuristic argument is found correct by the following theoretical analysis.

Suppose the incident light beam is initially at the angle of $\theta_o$, which is called the initial angle here, and we need to measure the angular displacement of $\Delta\theta$ from this initial angle. The angle of incidence $\theta_i$ equals $\theta_o + \Delta\theta$. Since $\theta_o$ is a constant, from Eq. (1) to Eq. (3), clearly the reflectances become functions of $\Delta\theta$ and we denote them as $R_s(\Delta\theta)$ and $R_p(\Delta\theta)$. The Taylor series expansion of $R_s(\Delta\theta)$ is:

$$R_s(\Delta\theta) = a_o + a_1\Delta\theta + a_2\Delta\theta^2 + a_3\Delta\theta^3 + \ldots \quad (4)$$

Where $a_o = R_s(\theta_o)$, $a_1 = R_s'(\theta_o)$, $$a_2 = \frac{1}{2}R_s''(\theta_o), \quad a_3 = \frac{1}{3}R_s'''(\theta_o).$$

Now assume that for a light beam with an angular displacement of $\Delta\theta$, another beam with an angular displacement of $-\Delta\theta$ can always be obtained simultaneously. This additional beam will yield a reflectance $R_s(-\Delta\theta)$, which can be expanded similarly as:

$$R_s(-\Delta\theta) = a_o - a_1\Delta\theta + a_2\Delta\theta^2 - a_3\Delta\theta^3 + \ldots \quad (5)$$

Subtracting Eq. (5) from Eq. (4) gives the difference of the reflectances $$R_s(\Delta\theta) - R_s(-\Delta\theta) = 2a_1 2a_3\Delta\theta^3 + \ldots \quad (6)$$

Notice that compared with the original reflectance $R_s(\Delta\theta)$ in Eq. (4), Eq. (6) has only odd terms left. Its non-linearity error should be much smaller than that of $R_s(\Delta\theta)$. Also, in order to compensate for the incident power change resulting from fluctuations of the incident light power or the nonuniformity of the reflecting surface (the later case occurs when this method is used to measure the inclination of a mirror or the profile of a test surface), the difference of the reflectances is normalized by the sum of the reflectances $R_s(\Delta\theta) + R_s(-\Delta\theta)$. The linearized reflectance $R_{sl}$ is then $$R_{sl} = \frac{R_s(\Delta\theta) - R_s(-\Delta\theta)}{R_s(\Delta\theta) + R_s(-\Delta\theta)} \quad (7)$$

where $$R_s(\Delta\theta) + R_s(-\Delta\theta) = 2a_o + 2a_2\Delta\theta^2 + \ldots \quad (8)$$

Figure 3:
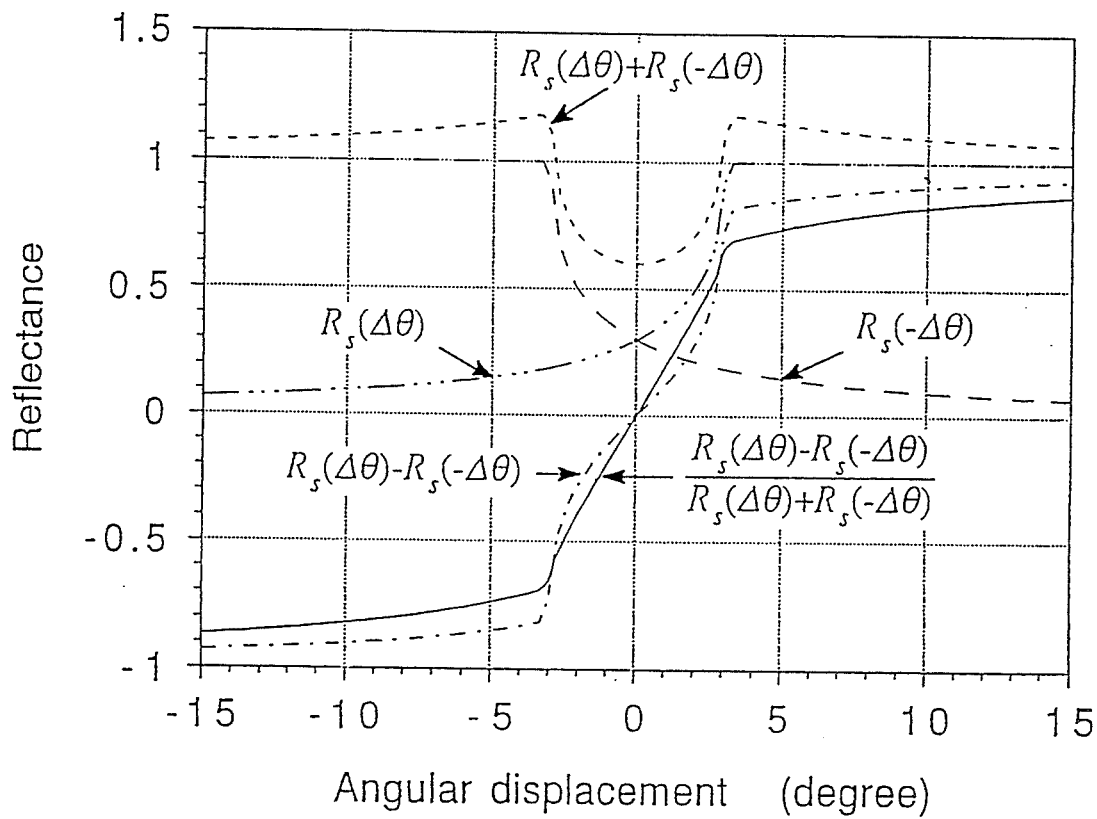

In FIG. 3 all the curves resulting from the above equations have been shown. The figure shows that the linearity of $R_{sl}$ versus the angle of incidence is significantly improved. Notice that $R_s(\Delta\theta) + R_s(-\Delta\theta)$ is not constant throughout the measurable range. Rather, it is approximately a parabola. From FIG. 3 it is clear that this normalization not only compensates the effect of the incident power change but also improves the linearity.

Figure 4:
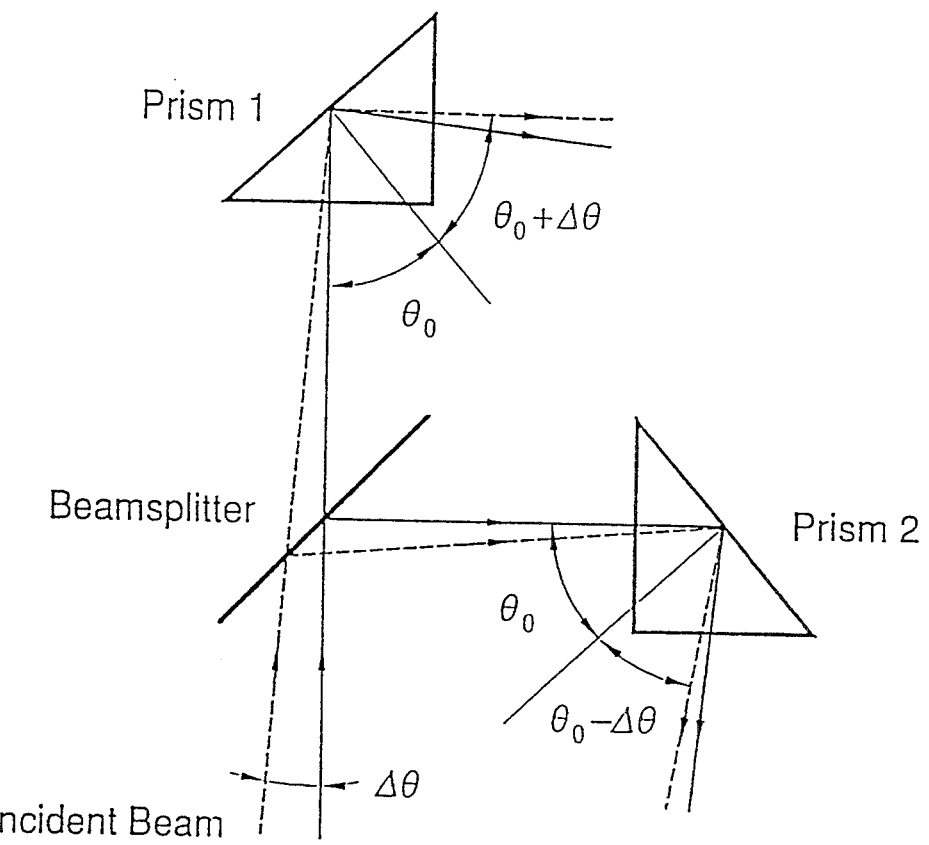

The question now is how to obtain the additional beam with an angular displacement of $-\Delta\theta$, whenever the incident beam has an angular displacement of $\Delta\theta$. The means for achieving this are simple and are displayed in FIG. 4. The incident beam is split with a half mirror, and two prisms reflect the two beams simultaneously. These two prisms are initially set so that their hypotenuse faces have the same angle $\theta_o$ with respect to the incident beams. When the incident beam is displaced an amount $\Delta\theta$, the beamsplitter reverses the sign of the angular displacement of the beam at prism 2, while the reflection at prism 1 remains unaffected. The reflection at prism 2 is $R_s(-\Delta\theta)$, if we can assume that the two prisms are identical.

Similarly, for p-polarized light, the reflectance is given by $$R_p(\Delta\theta) = b_o + b_1\Delta\theta + b_2\Delta\theta^2 + b_3\Delta\theta^3 + \ldots \quad (9)$$

and the linearized reflectance is defined as $$R_{pl} = \frac{R_p(\Delta\theta) - R_p(-\Delta\theta)}{R_p(\Delta\theta) + R_p(-\Delta\theta)} \quad (10)$$

Figure 5:
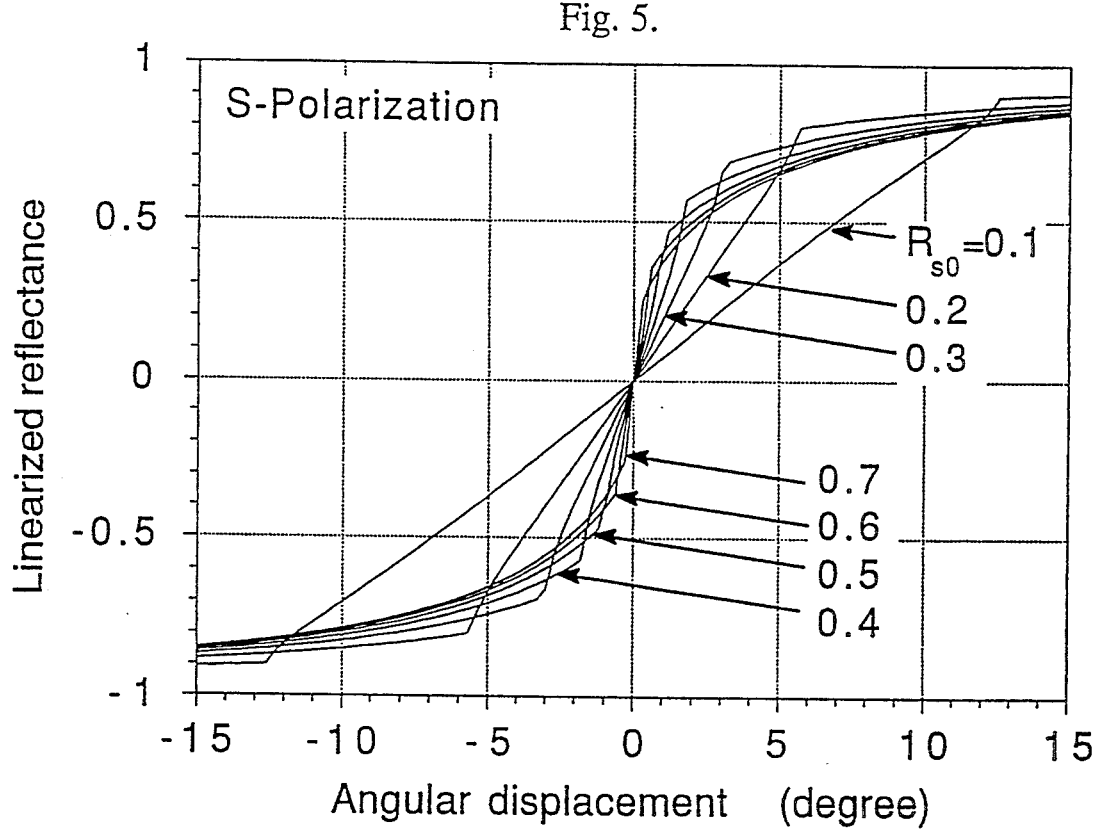
Figure 6:
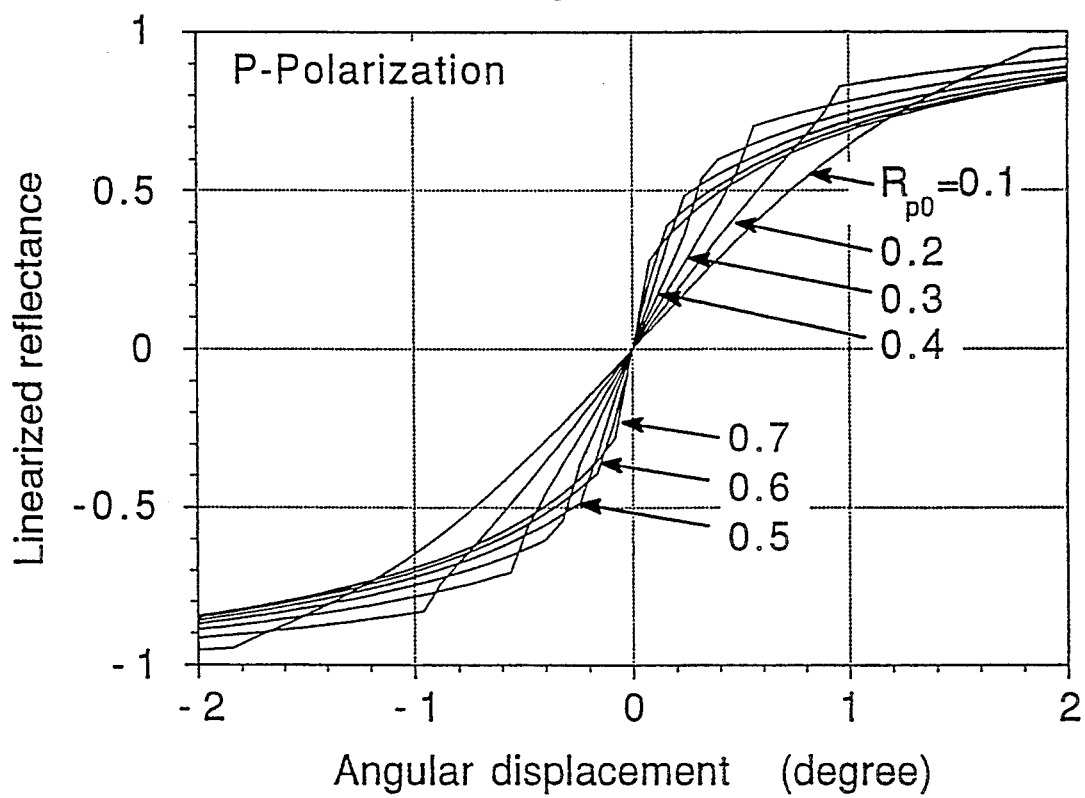

FIGS. 5 and 6 show the linearized reflectances $R_{sl}$ and $R_{pl}$ versus the incident angular displacement for various $R_{sO}$ and $R_{pO}$. $R_{sO}$ and $R_{pO}$ are the reflectances at the initial angle $\theta_O$.

It can be seen from FIGS. 5 and 6 that the sensitivity of the linearized reflectance with respect to the angular displacement increases with the initial reflectance while the measurement range decreases. Also, the linearized reflectance of the s-polarized light has a larger measurement range, which can well be over 25 degrees and still provide a good linearity. Compared with that of the s-polarized light, the linearized reflectance of p-polarized light has a better sensitivity but the measurement range is much smaller, only about 2 degrees. Hence p-polarized light is only suitable for small angle measurement. It should be pointed out that when a sensor is designed at a low initial reflectance for wide range measurement use, most of the incident light power will be lost by transmission. This is not favorable in terms of efficient use of light power and signal to noise ratio. In such a case, however, transmittance can be measured instead of reflectance. Then, reflectance can be calculated from transmittance since the sum of transmittance and reflectance equals one. To collect the transmitted light more efficiently an additional converging lens which focuses the transmitted beam onto the photodiode might be needed, especially in the wide range application.

Sensitivity and Non-linearity.

Sensitivity and non-linearity depend on the polarization state of the light beam, the initial angle of incidence, and the number of reflections inside the prisms. The following theoretical analysis shows this dependency quantitatively.

Let $$R_s(\Delta\theta) = c_1\Delta\theta + c_3\Delta\theta^3 + \ldots \quad (11)$$

By deriving the coefficients of the Taylor's series in Eq. (4) and then substituting into Eq. (7), $c_1$ and $c_3$ can be obtained as follows.

$$c_1 = \frac{a_1}{a_0} = 4\tan\theta_t \quad (12)$$

$$c_3 = \frac{a_0 a_3 - a_1 a_2}{a_0^2} = 4\tan\theta_t \frac{1}{2}(n^2-1)\sec^4\theta_t - 5\sec^2\theta_t + \frac{16}{3} \quad (13)$$

Similarly, for p-polarized light, let $$R_p(\Delta\theta) = d_1\Delta\theta + d_3\Delta\theta^3 + \ldots \quad (14)$$

Similar analysis shows $$d_1 = \frac{b_1}{b_0} = \frac{4\tan\theta_t}{u} \quad (15)$$

$$d_3 = \frac{b_0 b_3 - b_1 b_2}{b_0^2} = 4\tan\theta_t \frac{1}{2}(n^2-1)\sec^4\theta_t + \quad (16)$$

$$\frac{1}{3}\sec^2O_t \frac{1}{3u}(n^2+1)(2\cos^2\theta_o\sec^2\theta_t + \cos2\theta_o) +$$

$$\frac{1}{3u^2}(n^2+1)^2\sin^2 2\theta_o - \frac{16}{3u^2}\tan^2\theta_t$$

where $u = -\cos(\theta_o - \theta_t)\cos(\theta_o + \theta_t)$ and $\theta_t$ is the angle of refraction at the angle of incidence of $\theta_o$.

Figure 7:
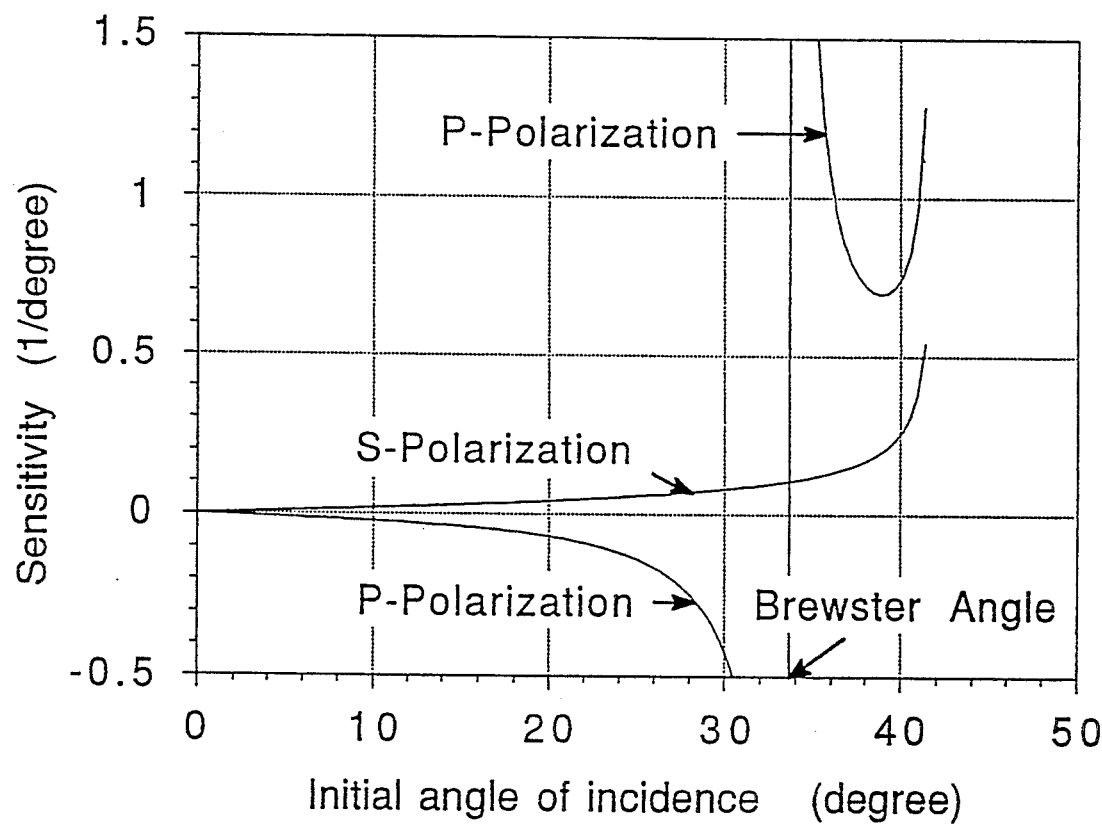

From Eqs. (11) and (14) we see that if the linearized reflectances are fit by linear lines, $c_1$ and $d_1$ will be the sensitivities and $c_3\Delta\theta^3$ and $d_3\Delta\theta^3$ plus the higher order terms will be the non-linearity errors. In FIG. 7 the sensitivities for both the s-polarization and p-polarization cases versus the initial angle of incidence are shown for comparison. For p-polarized light the curve for an initial angle of incidence smaller region decreases as the angle of incidence increases. It was found that the non-linearity in this case can be very large. Comparing both curves, we see that the sensitivity for the p-polarization case is much larger than that for the s-polarization case (in the region beyond the Brewster Angle, it is approximately twice as large). It is also apparent that the sensitivities in both cases increase rapidly in the vicinity of the critical angle.

Figure 8:
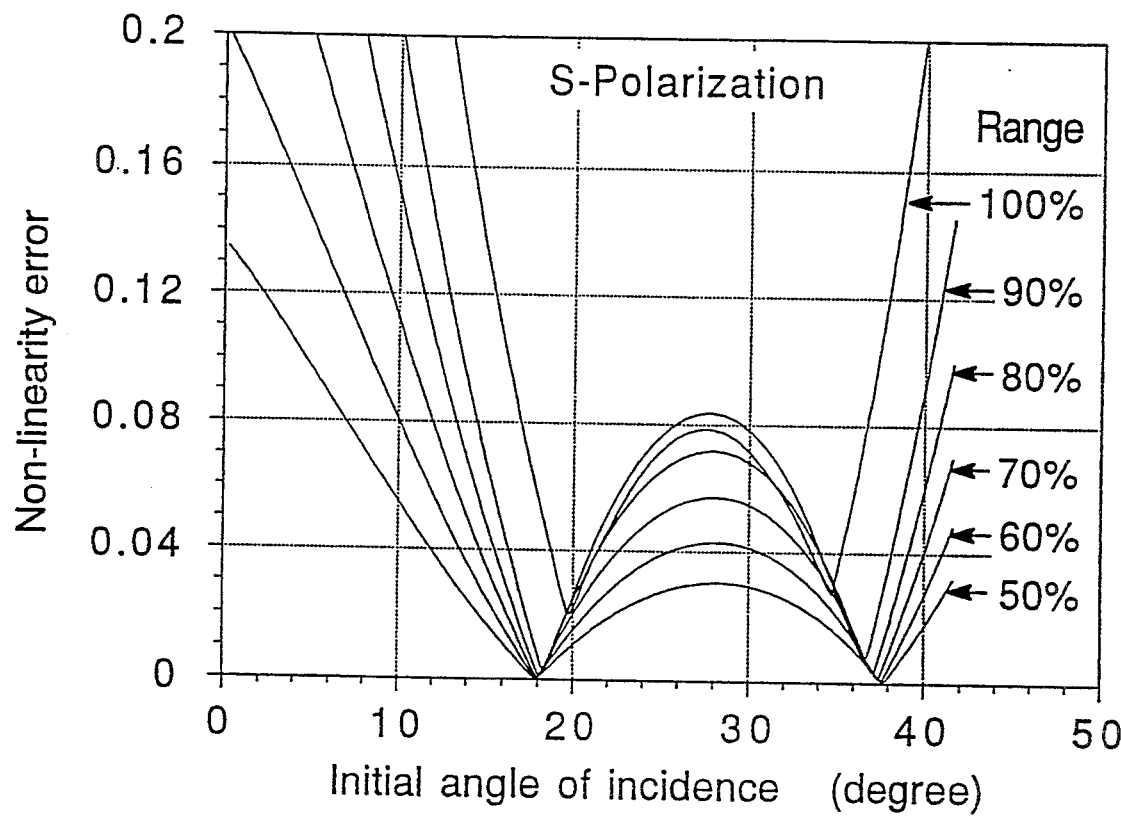
Figure 9:
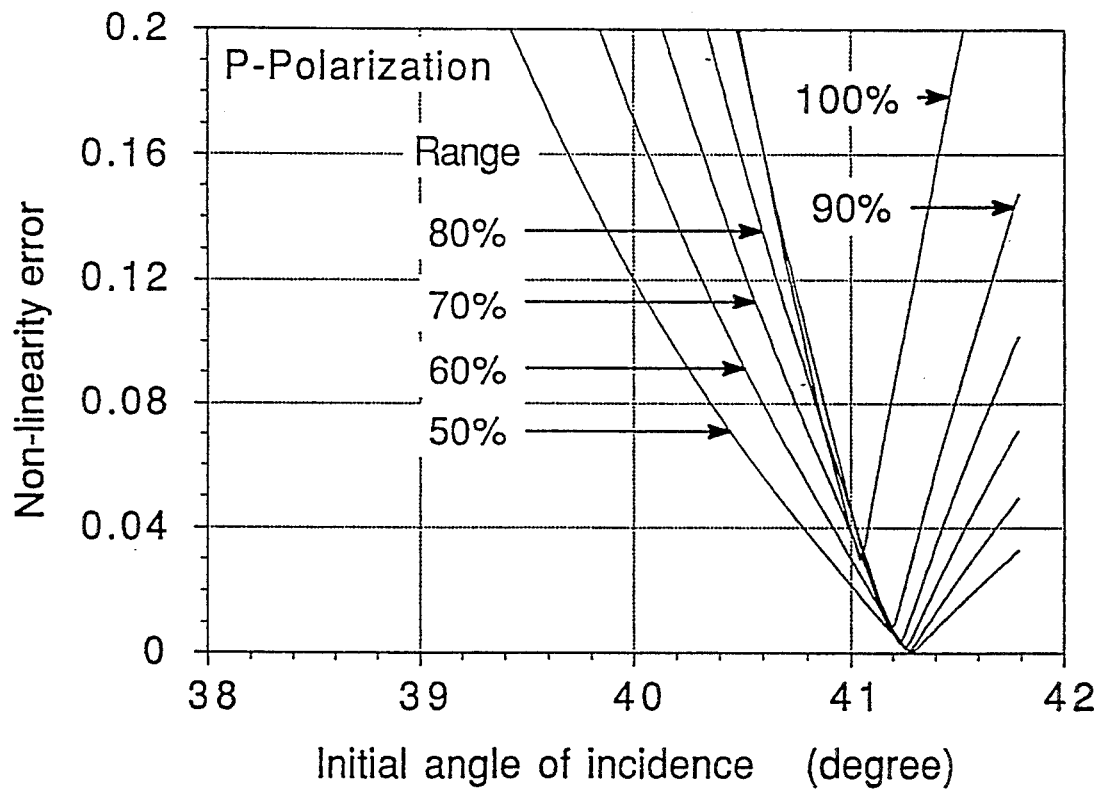

FIGS. 8 and 9 show the non-linearity errors as functions of the initial angle of incidence. The non-linearity error is defined as the maximum deviation of the linearized reflectance curves from corresponding linear lines determined by $c_1$ and $d_1$. Six curves have been plotted, each for a different percentage of the total measurable range. We see that the smaller the percentage of the total measurable range being used, the smaller the non-linearity error. For s-polarized light, there exist two initial angles of incidence, 17.8° and 37.6°, at which the non-linearity error approaches zero. These two angles are optimum and should be chosen when designing a sensor for optimum performance. Notice if we set Eq. (13) to equal zero and solve for $\theta_2$ and then $\theta_1$ (disregard the solution for $\tan\theta_2 = 0$, which has no meaning), we obtain two solutions $$\theta_i = \sin^{-1}\frac{1}{n_i}\sqrt{\frac{17 + 321 - 96n_i^2}{32}} = 17.83°, 37.96°, \quad (17)$$

which are approximately equal to those determined from the non-linearity graphs. We can conclude that the non-linearity error is mainly due to the third order term in the linearized reflectance. Similarly, for the case of p-polarization it can be seen from FIG. 9 that there is only one optimal initial angle, 41.3° instead of two as in the case of s-polarization. By setting Eq. (16) equal to zero and solving numerically for $\theta_t$ and then $\theta_i$, we find that the solution is 41.29° which is approximately the same as the value obtained using the condition for smallest non-linearity error. As in the case of s-polarized light, we conclude that the non-linearity error is mainly due to the third order term in the linearized reflectance.

Figure 10:
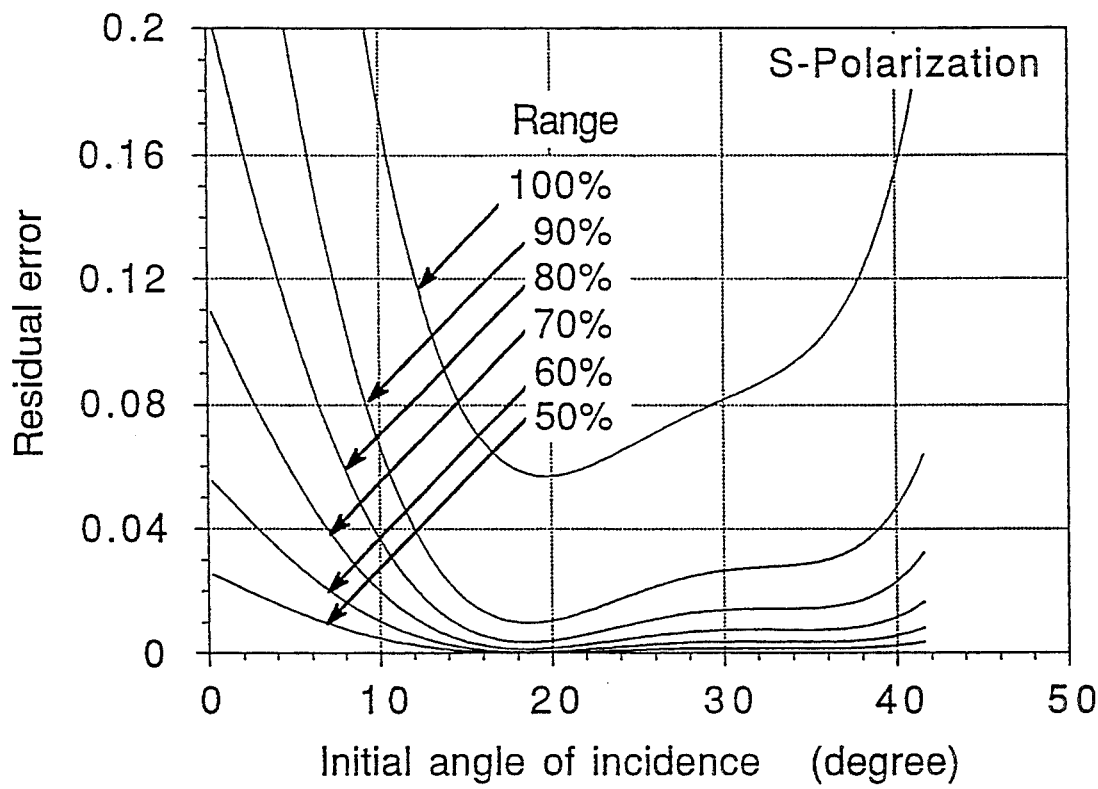
Figure 11:
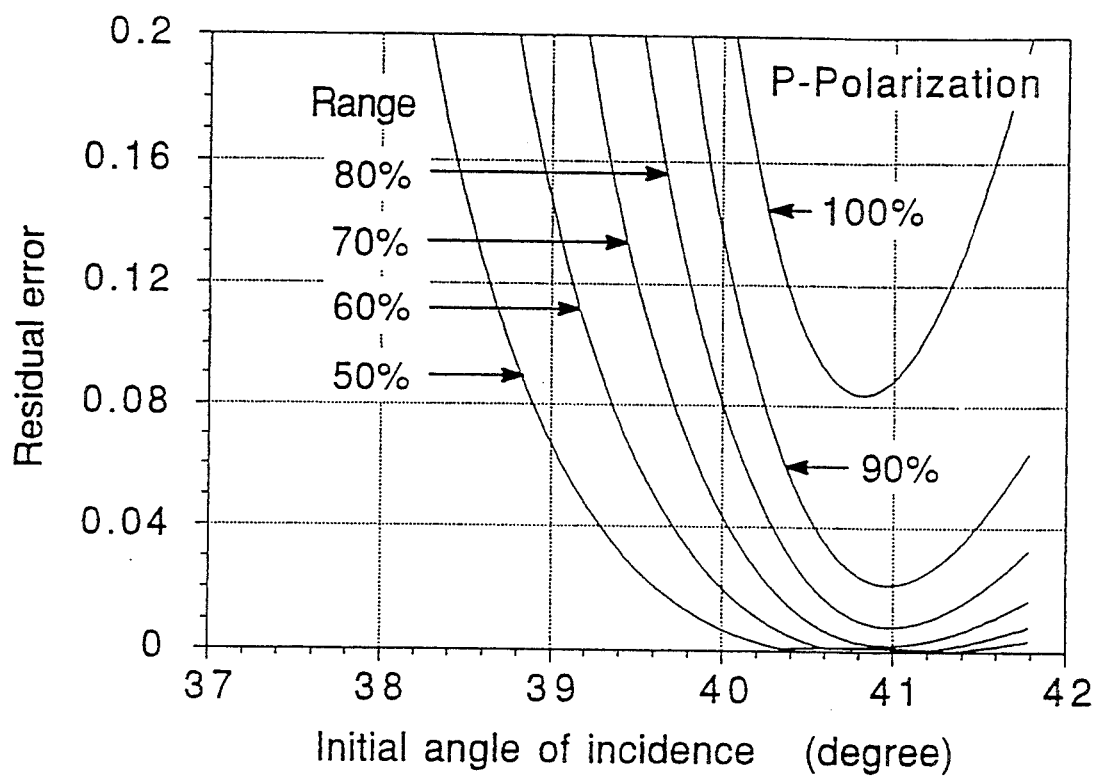

FIGS. 10 and 11 show the residual error of the linearized reflectance fit with both the first and third order terms. Compared with a fit using only the first order term, the errors are small in a much wider range, which gives more flexibility in the design process. Note that the optimum angles are virtually unchanged.

Figure 12:
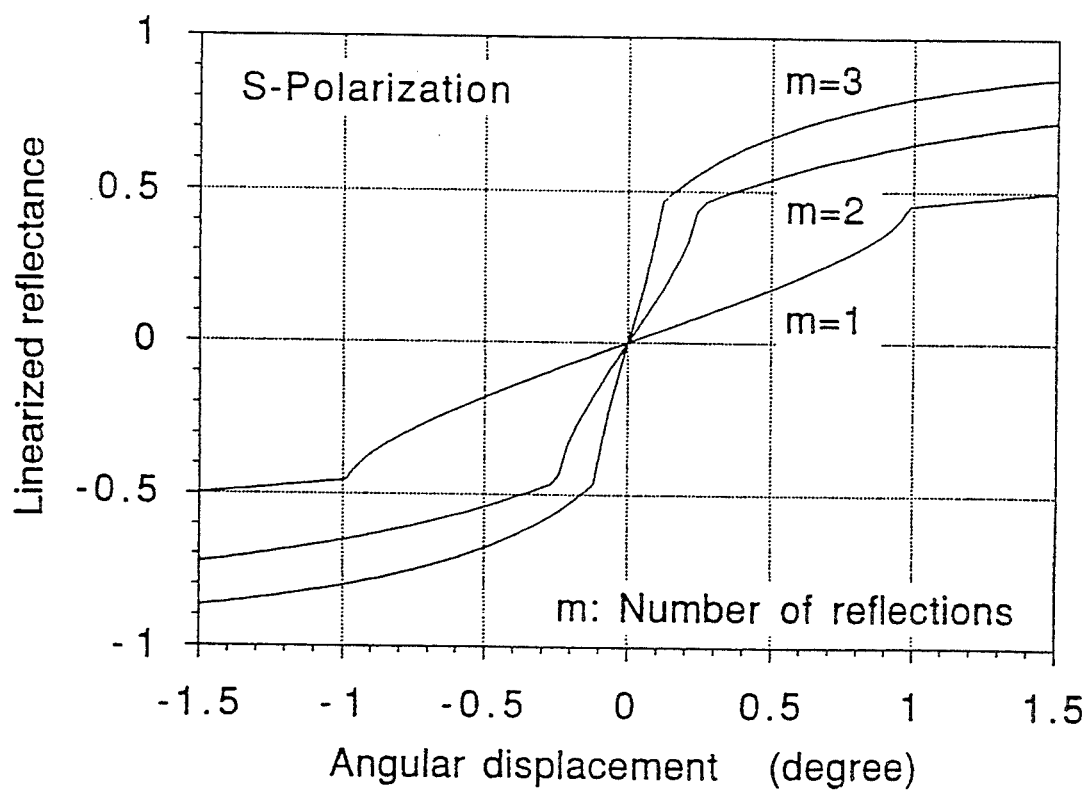

As seen in the above analysis, the sensitivity of this angle measurement method can be chosen by selecting the polarization state and the initial angle of incidence. Another significant advantage of this method is that the sensitivity can also be increased by introducing multiple reflections at identical boundaries. In this case, the reflectances become $R^m_s(\Delta\theta)$ and $R^m_p(\Delta\theta)$ where m is the number of the multiple reflections. FIG. 12 shows the linearized reflectances for up to three reflections. Clearly, the sensitivity increases rapidly with the number of reflections. This characteristic is extremely useful when the method is to be used for high resolution applications, since the only thing that needs to be altered for higher resolution is to extend the length of the reflection prisms. The only limiting factor is the geometric error and the inhomogeneity of the material of the reflection prisms.

Possible Error Sources.

Two possible error sources of this method are:

1) Angular displacement of the laser beam in the plane perpendicular to the measurement plane.

Figure 13:
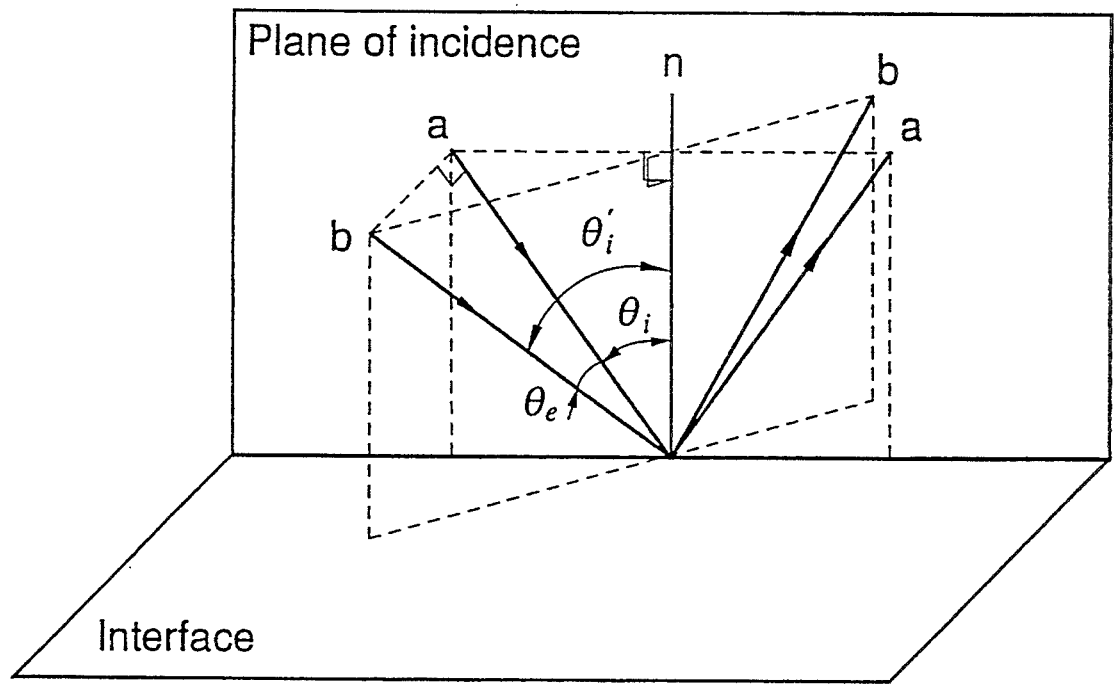

Angular displacement of the incident beam in the plane perpendicular to the measurement plane causes the actual angle of incidence of the beam to be larger than the angle of incidence in the measurement plane, which causes measurement error. Let $\theta_i$ be the angle of incidence in the measurement plane, which we want to measure, let $\theta_e$ be the angular displacement in the plane perpendicular to the measurement plane, and let $\theta_i$ be the resultant angle of incidence. From the geometric relationship of the three angles, shown in FIG. 13, the following equation can be obtained.

$$\cos \theta_i = \cos \theta_e \cos \theta_i \quad (18)$$

For high resolution measurement $\theta_e$ is small, and the resultant error can be neglected. For example, if $\theta_e = 1°$ the resultant error will be less than 0.015%. For wide range measurement $\theta_e$ is large, and the resultant error cannot be neglected. However, if two sets of the measuring unit are assembled together to measure the angular displacements in both directions, then Eq. 18 can be used to compensate the errors, providing higher accuracy.

2) Beam divergence.

Another possible error source is the divergence of the incident laser beam. In the above analysis we have assumed that the incident laser beam is a perfectly collimated beam and treated it as a single light ray. However, in reality, a laser beam always has a divergence which is inversely proportional to its diameter no matter how well it is collimated. The effect of beam divergence on the reflectance curve is the same as taking a running average of the reflectance curve. If the divergence is large, i.e., the running average length is long, the reflectance curve will be severely rounded near the ends of the measurement range, which reduces the linear range of the characteristic curve. However, for a typical beam divergence of 1–2 mrad, calculations show that the error is very small and can be neglected.

New Sensor Apparatus.

Figure 14:
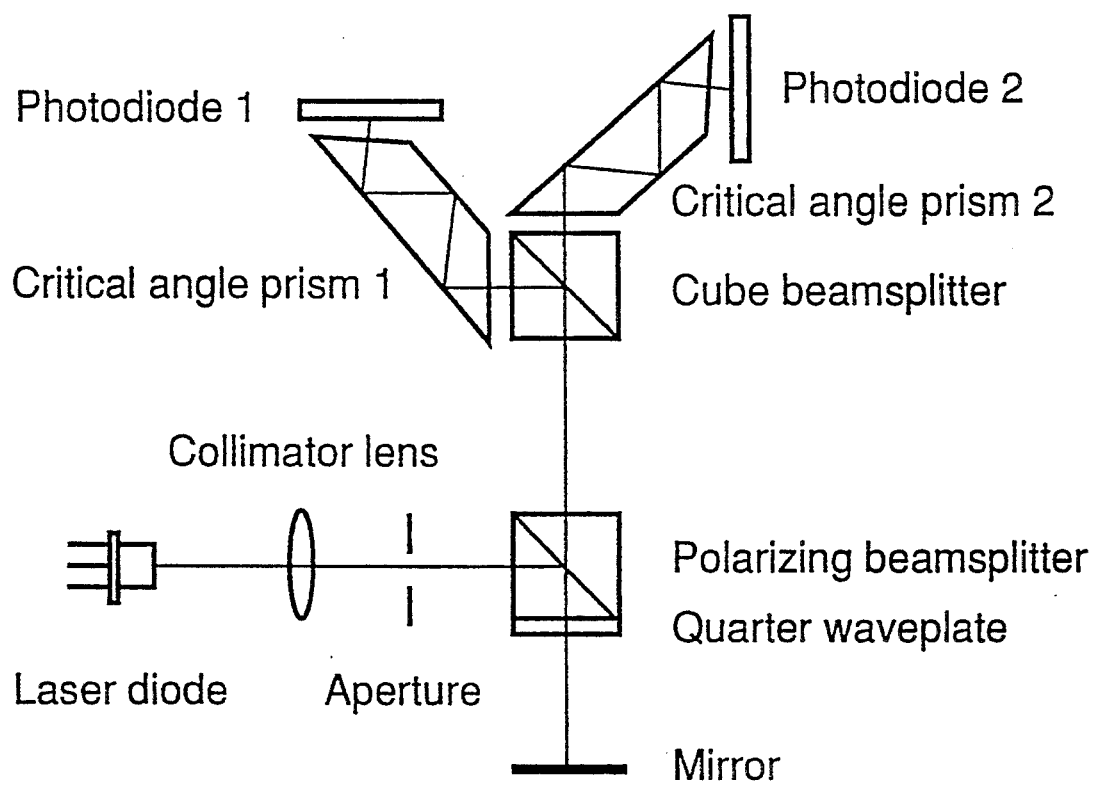

In order to demonstrate the feasibility of the method discussed above, a small angle sensor based on this principle has been built. FIG. 14 shows the optical schematic of the sensor. A laser diode operating at a wavelength of 780 nm provides the light source. The output light beam is collimated by a collimator lens, and the light beam diameter is reduced to 1 mm by an aperture on a hard paper. The light beam is then directed to a mirror via a polarizing beamsplitter and a quarter wave plate, The mirror is the component subjected to the angular displacements, With the quarter wave plate the reflected beam passes totally through the polarizing beamsplitter. This light beam is then split by a cube beamsplitter into two identical beams. Two critical angle prisms are used as the reflection prisms. A critical angle prism is a prism whose hypotenuse face forms an angle equal to the critical angle with its incident face. As stated previously, for small angular displacement measurement, the initial angle of incidence is set to a value in the vicinity of the critical angle to ensure good resolution. By using critical angle prisms, unwanted reflection effects at the incident faces of the prisms can be minimized. To obtain even higher resolution, three time reflection type critical angle prisms are used in this sensor. Also, for the same reason, p-polarized light is used as the incident light. The initial angle of incidence is set so that the initial reflectance is approximately 0.5, which is not necessarily the optimal value in terms of smallest non-linearity error. The reflected light beams are collected by two photodiodes, and the generated photo currents are changed to voltages with amplification via built-in preamplifiers. The amplified signals are then sampled by a digital voltage meter and sent to a personal computer where the linearized reflectance is calculated.

Figure 15:
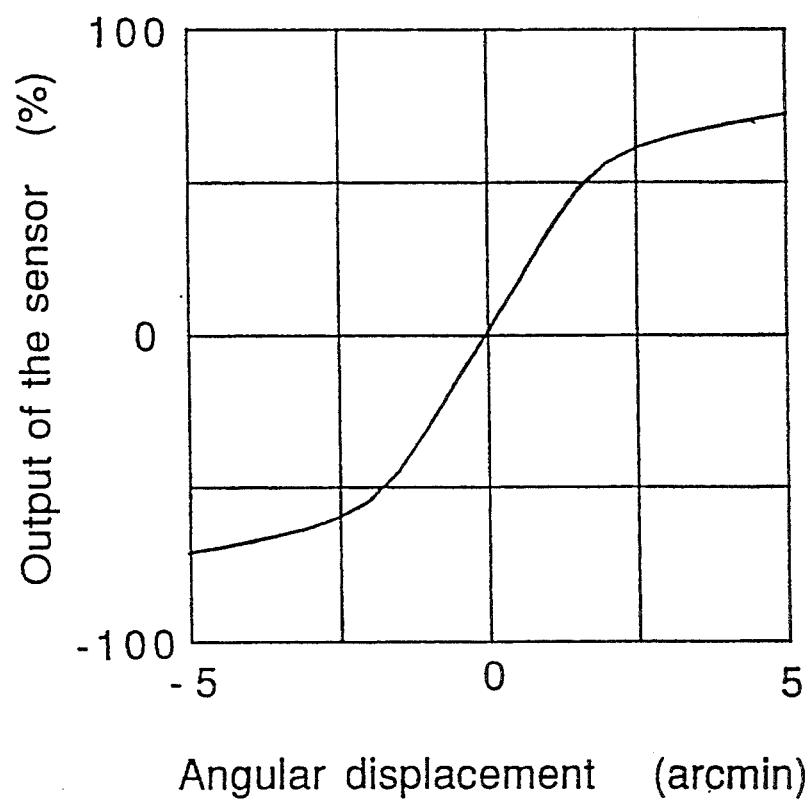
Figure 16:
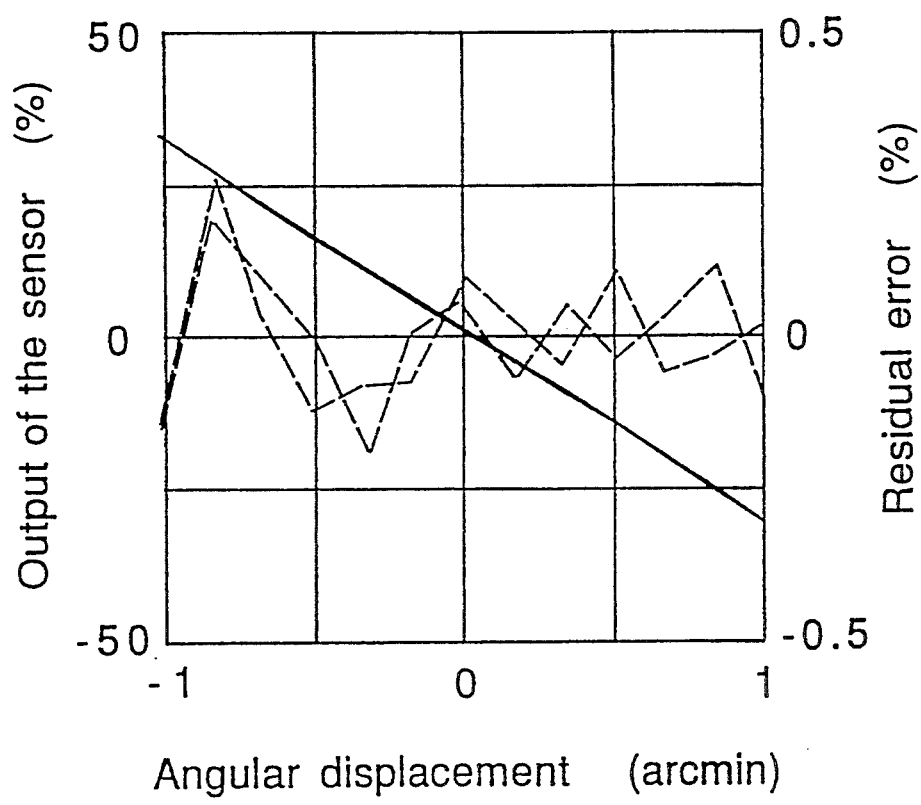
Figure 17:
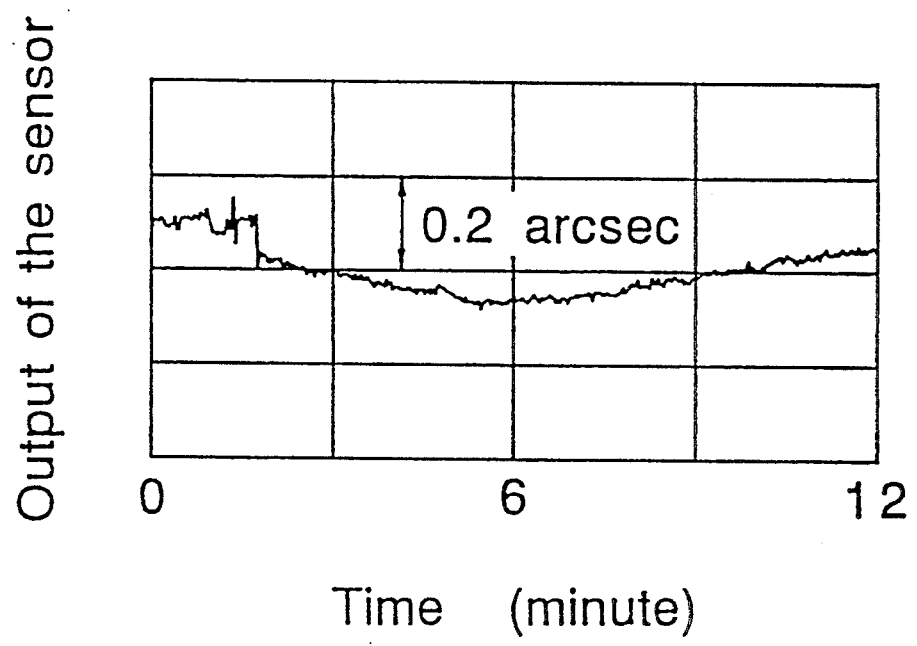

FIG. 15 shows the linearized reflectance curve of the sensor for a range of 10 minutes of arc. Good linearity is achieved for a range of approximately 3 minutes of arc. The improvement in linearity using the above differential method is qualitatively confirmed. In FIG. 16 we focus on the central 2 minutes of arc range and show the residual error when fit with a third order polynomial. The error is approximately 0.7%. The experiment was repeated twice and the results indicate a good repeatability. Also the stability, or drift, of the sensor was tested. FIG. 17 shows the result of a 12 minute test. The drift in this time period is approximately 0.2 second of arc and the noise level is approximately 0.02 second of arc over most of the test period.

Applications.

The method of angle measurement proposed here is very different from conventional optical methods, which are generally based either on interference or auto-collimation. The advantage of the new method lies in the compact size, simple structure, low cost, and easy design of the sensors for a wide class of measurement ranges and required resolutions. Because of these unique advantages, the new method has applications in the fields of metrology, control, precision engineering and manufacturing technology. Some of the possible applications follow. For some of these applications conventional angle measurement methods are not possible.

1) Cantilever deflection detection and control of AFMs

In this interesting application, the new method can be used to measure and control the deflection of the cantilever in AFMs. Many AFM researchers currently use an interferometric method to measure the displacement of the cantilever instead of directly measuring the deflection angle. This configuration requires that the cantilever be fixed and the sample scanned during measurement, making the device suitable only for small sample and small scan area measurement. By using the new method, the cantilever's angular deflection rather than the indirect displacement can be measured, which means the cantilever can be scanned instead of the sample. This major advantage makes the device suitable for much wider applications. Another advantage of the new method comes from the compact size of the angular deflection measurement unit, which makes the whole device compact.

2) Surface profiling and vibration analysis

The prototype sensor configuration shown in FIG. 14 can be used for surface profiling of optical elements such as mirrors and lenses, which is conventionally performed by interferometers or autocollimators. Compact size, simple structure, and high resolution make the new method more suitable for on-line measurement of the products during machining. With the same configuration, the new method is also suitable for high accuracy vibration monitoring.

3) Geometric error measurement and accuracy control of moving tables

Generally geometric error measurement is performed with an interferometer. Although interferometers usually have high accuracy, they are essentially for off-line measurement. Consequently, they cannot be used for on-line real time geometric error measurement and accuracy control of machine tools. More recent developments use laser alignment techniques in which angular errors are measured by the auto-collimation method.

This laser alignment technique shows promise for on-line measurement and compensation of geometric errors of machine tools. The new method can also be used for this application in real time and the compact size of the new device can make it easier to integrate with machine tools than the above laser alignment technique.

4) Laser pointing accuracy control and laser mirror servocontrols

Using the new angle measurement method, a laser beam's pointing accuracy can be monitored and controlled if combined with high accuracy active mirrors in a compact device. Similarly, sensors based on this method can be used on high accuracy monitoring devices for laser mirror servocontrol systems.

5) Wide range angle measurement

As seen in the analysis above, sensors using s-polarized light, low initial reflectance, and single reflection type prisms have a very wide measurement range with good linearity (approximately 48° at the optimal initial angle of incidence). Wide range measurement is difficult for conventional interferometers and autocollimators because of the non-linearity of the sin/tan function. For this application care should be taken to avoid any aberration in the prisms and the light noise due to the unwanted multiple reflections inside the prisms.

In summary, the angular displacement can be accurately measured using the linearized reflectance. The sensitivity, the measurement resolution and range are determined by the initial angle, the polarization state, and the number of reflections inside the prisms. Using a larger initial angle (close to the critical angle), p-polarization, and multiple reflection provides better resolution at the expense of reducing the measurement range. In theory, the resolution can be increased infinitely by increasing the number of reflections or the length of the prisms. In reality, though, resolution is limited by the geometric accuracy of the reflection prisms and the material inhomogeneity. The non-linearity error analysis reveals that there are two optimal initial angles for s-polarization and one for p-polarization. These initial angles are optimal in the sense that the non-linearity error of the linearized reflectance approaches zero. The initial angles should be used as criteria for achieving the best linearity performance.

Measurement Systems.

Figure 18:
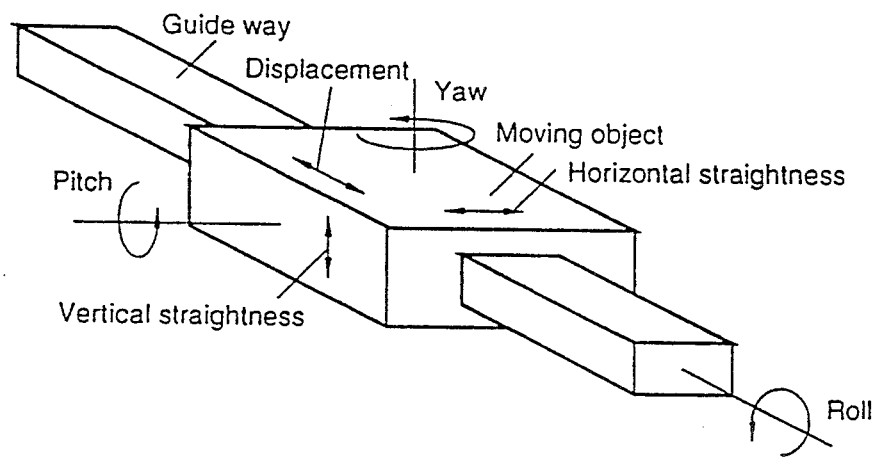
FIG. 18 illustrates in perspective a mechanical slide.

FIG. 18 illustrates a six-degree-of-freedom mechanical slide to which the above angular error measurement system may be applied. The "displacement" is the linear back and forth movement for which the slide is intended. "Pitch" and "yaw" error are measured with the angle measurement system as more fully described below. With the modification described below vertical straightness error and horizontal straightness error are also simultaneously measured.

Figure 19:
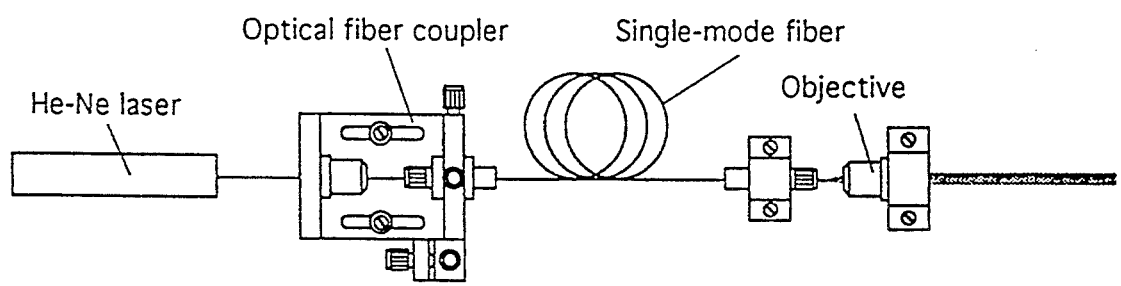
FIG. 19 schematically illustrates a single-mode optical fiber beam delivery system.

FIG. 19 illustrates schematically the optical beam delivery system that provides the exceptionally stable laser beam. A conventional Helium-Neon laser tube of 10 milliwatts is the light source. The output light is a collimated beam. A single-mode fiber coupler launches the beam into a single-mode optical fiber. At the output end of the fiber, an objective such as a microscope objective is used to collimate the beam to the desired beam diameter for the measuring system.

Figure 20A:
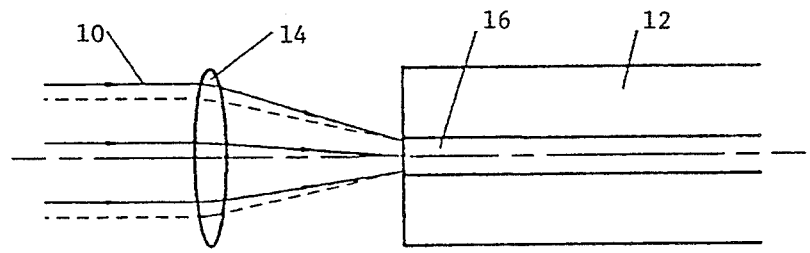
FIGS. 20a and 20b illustrate light injection drift to a single-mode optical fiber.
Figure 20B:
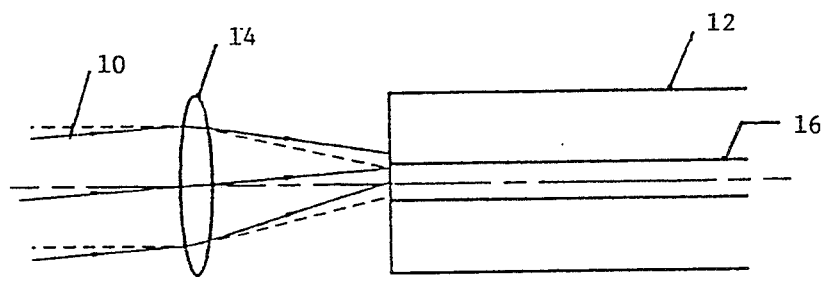

Illustrated in FIGS. 20a and 20b is the means of substantially reducing beam instability. The laser beam 10 from the laser tube may have lateral drift FIG. 20a or angular drift FIG. 20b relative to the single mode fiber 12. Despite an objective lens 14 in the fiber coupler the beam 10 is improperly launched into the fiber core 16 as shown. The result of the lateral drift is the deviation of the intensity profile from the original Gaussian distribution, while the result of the angular drift is the lateral shift of the focused beam as well as the deviation of the intensity profile.

Since a single mode fiber only sustains one mode, the basic mode, only the basic will be triggered and pass through the fiber regardless of the injection condition. Thus, even though the output intensity level may change due to the change of launching condition, the position and the intensity profile of the output beam from the fiber does not change. The result is a dramatic reduction in beam pointing instability.

Some other advantages obtain in using a fiber optic beam delivery system because the fiber is flexible. Where the slide of FIG. 18 is on a machine tool, the machine structure may greatly complicate conventional beam delivery systems based on mirrors and beam splitters. The fiber may be curved as necessary as shown in FIG. 19. The fiber also has a filtering effect that reduces beam noise. Furthermore, if a fiber-optic beam splitter (in a fiber coupler) is used, a multiple beam delivery system can be easily constructed with a simple optical system.

To improve the measurement sensitivity a multiple reflection method uses a pair of elongated critical angle prisms as the reflection prisms. Theoretical analysis shows that the measurement sensitivity is increased in proportion to the square of the number of reflections, which implies that increasing the number of reflections is an effective way of increasing the measurement sensitivity. Also, as in the single reflection described above, the non-linearity error can be minimized by optimizing $\theta_o$.

Figure 21A:
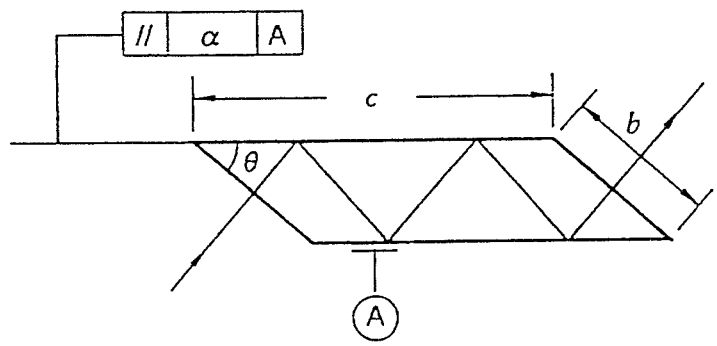
FIGS. 21a and 21b illustrate an elongated critical angle prism.
Figure 21B:
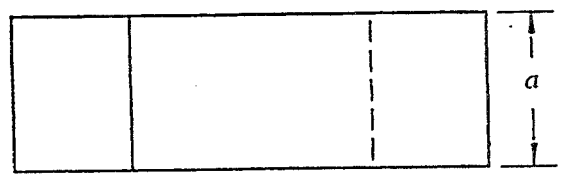

Since the applications of the system are mainly for machine tools and coordinate measuring machines and the requirement of such applications is high resolution, the multiple reflection method with the critical angle prisms is designed for four reflections. FIGS. 21a and 21b show the schematic diagram for the prisms. Suitable specifications for the prisms, including dimensions and quality requirements, are listed in Table 1. For better performance, the prisms should be made in pairs so that the two prisms of a pair have similar characteristics.

TABLE 1

Specifications of the Critical Angle Prisms

| | |
|---|---|
| Dimensions: | a = 10 mm, b = 10 mm, c = 23.19 mm* |
| Dimension Tolerance: | ±0.15 mm |
| Angle Θ: | 41.30°** |
| Angle Tolerance: | ±3 arcmin |
| Refractive Index n: | 1.515247 |
| Wavelength λ: | 632.8 nm |
| Flatness: | λ/4 at 632.8 nm over 90% of edge dimention |
| Parallelism α: | ±30 arcsec between two reflection faces |
| Material: | K9 grade A fine annealed (made in China) |
| Surface Quality: | 60-40 scratch and dig |
| Coating: | Antireflection coating on the entrance and exit faces |
| Other Requirements: | Sides fine grounded and all edges lightly beveled |
| | Make by pairs so that two prisms of a pair have similar characteristics |

*c is obtained from the equation c = 4bsinΘtanΘ, which has different values for different glass materials
**Critical angle for K9 glass at wavelength 632.8 nm. If other glass material is used, Θ should be the critical angle for that material (Θ-arcsin(1/n)).

Illustrated in FIGS. 22a and 22b are position sensing detectors (PSDs). A PSD is a lateral effect silicon photodiode that provides continuous position information for a light spot on its surface, FIG. 22a shows a one dimensional PSD with the black spot representing a light spot striking the detector. If the outputs are $X_1$ and $X_2$ then the position is:

$$P = \frac{X_1 - X_2}{X_1 + X_2} \quad (19)$$

In order to eliminate the influence of the intensity of the incident beam, the differential output is normalized by the sum of the outputs. The sum of the outputs is proportional to the intensity of the light beam. Therefore, the PSD also provides the intensity of the light beam. Since the angle measurement system above disclosed is based on the detection of light intensities, both straightness and angular error can be measured simultaneously.

FIGS. 23a and 23b show part of the optical system which may be mounted on a slide such as in FIG. 18 for example. This part of the system can measure two error components, one straightness error and one angular error. FIG. 23a shows the case when the moving object has a straightness error and FIG. 23b shows the case when the moving object has an angular error.

As noted above, the straightness error can be obtained from the position output of the PSDs, while the angular error can be obtained from the intensity output of the PSDs. Since the two outputs are essentially independent, the two measurements are essentially independent. If $X_{11}$ and $X_{12}$ are the outputs of PSD1, and $X_{21}$ and $X_{22}$ are the outputs of PSD2, the straightness error and angular error are as follows:

$$S = \frac{(X_{11} - X_{12}) + (X_{21} - X_{22})}{(X_{11} + X_{12}) + (X_{21} + X_{22})} \quad (20)$$

$$O = \frac{(X_{11} + X_{12}) - (X_{21} + X_{22})}{(X_{11} + X_{12}) + (X_{21} + X_{22})} \quad (21)$$

Figure 24:
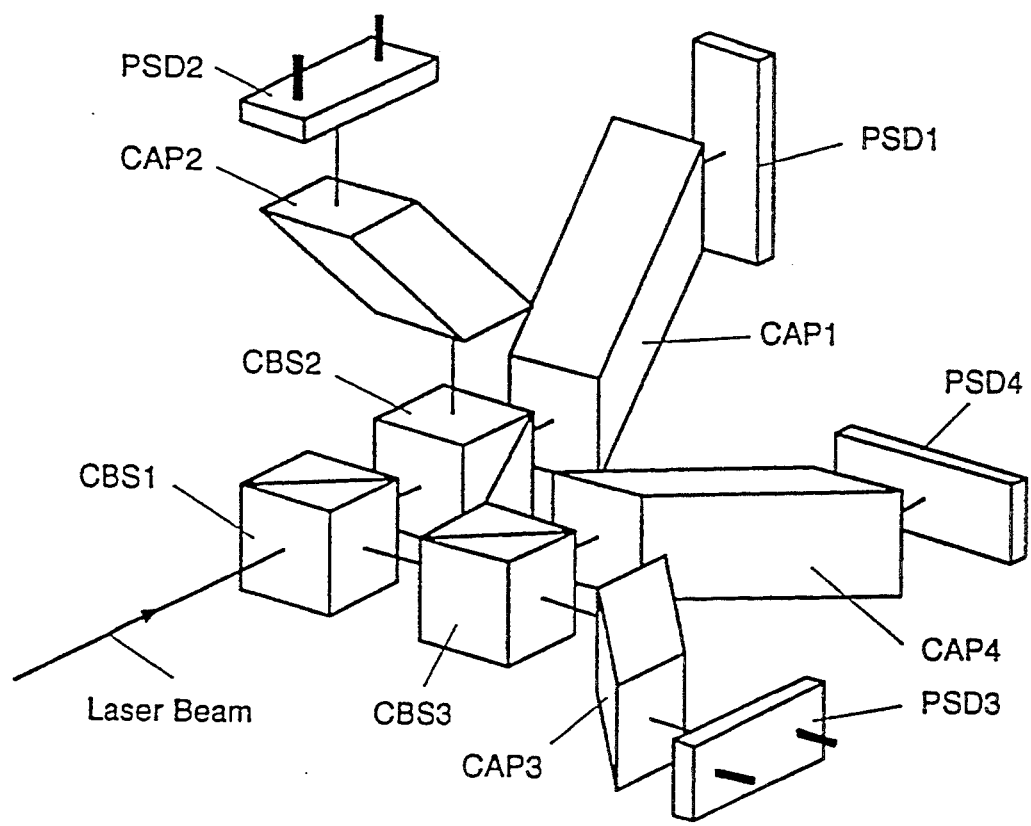
FIG. 24 illustrates the optical layout of a four-geometric-error measurement system.

FIG. 24 shows the entire optical system, which is the combination of two identical systems shown in FIG. 23. One system is in the horizontal plane and the other system is in the vertical plane to measure the four error components, the horizontal straightness, the vertical straightness, pitch and yaw. The incident laser beam is a p-polarized beam, which is obtained by adding a polarized beam splitter to the output end of the single-mode fiber beam delivery system.

Cube beam splitters CBS1, CBS2 and CBS3 are non-polarizing beam splitters with a beam splitting ratio of 50%:50%. Therefore the incident beam reflected by CBS1 remains p-polarized to the system in the horizontal plane comprising CBS3, CAP3, CAP4, PSD3 and PSD4. Even though the incident beam passing through CBS1 does not change its polarization state, it becomes s-polarized to the system comprising CBS2, CAP1, CAP2, PSD1 and PSD2 because this system is in the vertical plane. Since the measurement sensitivity using s-polarized light is lower than that using p-polarized light, the sensitivity difference may be alleviated by increasing the electronic amplification rate for the s-polarized light.

Figure 25:
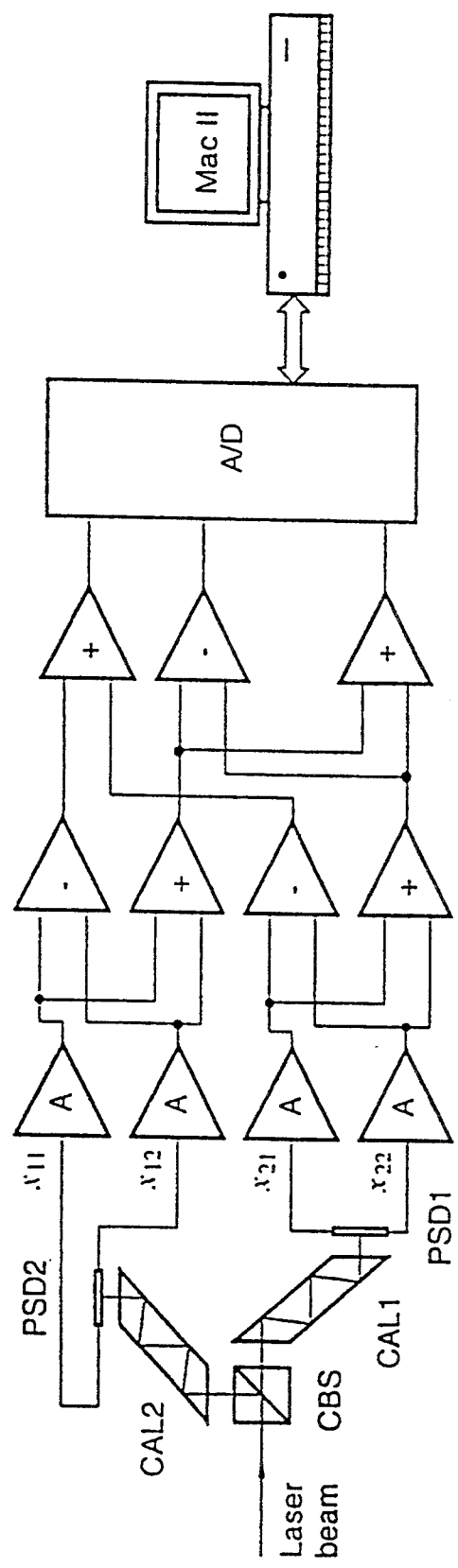
FIG. 25 illustrates a simplified electronic signal conditioning system.

FIG. 25 shows the electronic signal conditioning system and the data acquisition system for one-half of the measurement system. All of the signal conditioning electronics are assembled together with the optical system to reduce signal transmission noise. The entire physical assembly of the optical and electronic components can be made small and light for installation on the slide as a small package. A prototype system measures 114×76×57 mm.

Figure 26:
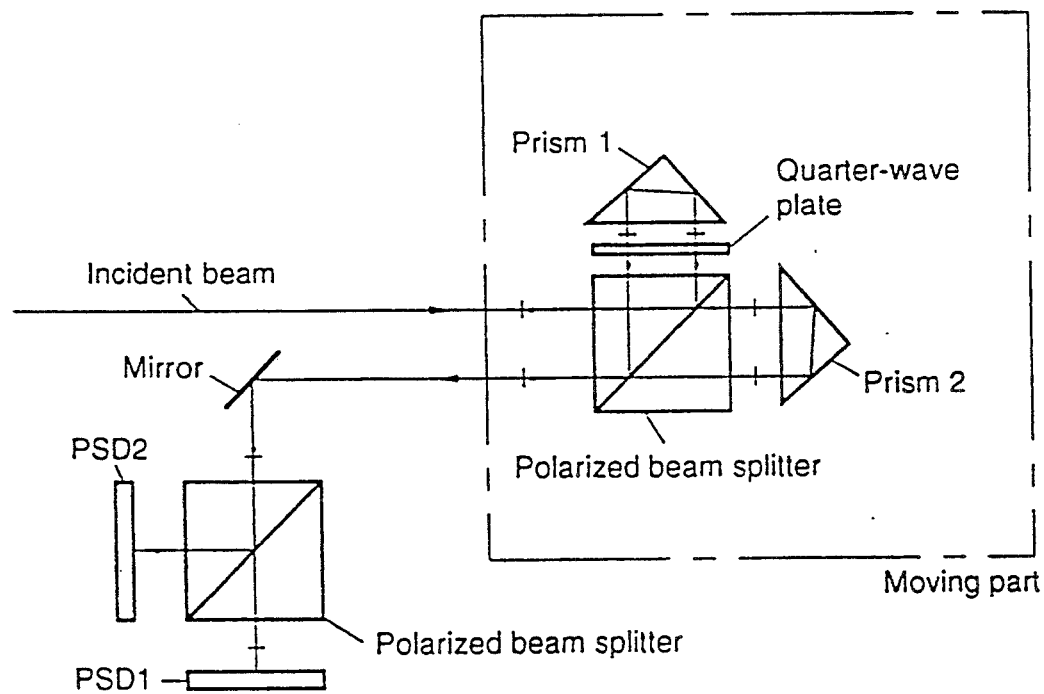
FIG. 26 illustrates the optical layout with single reflection prisms acting as retroreflectors.
Figure 27:
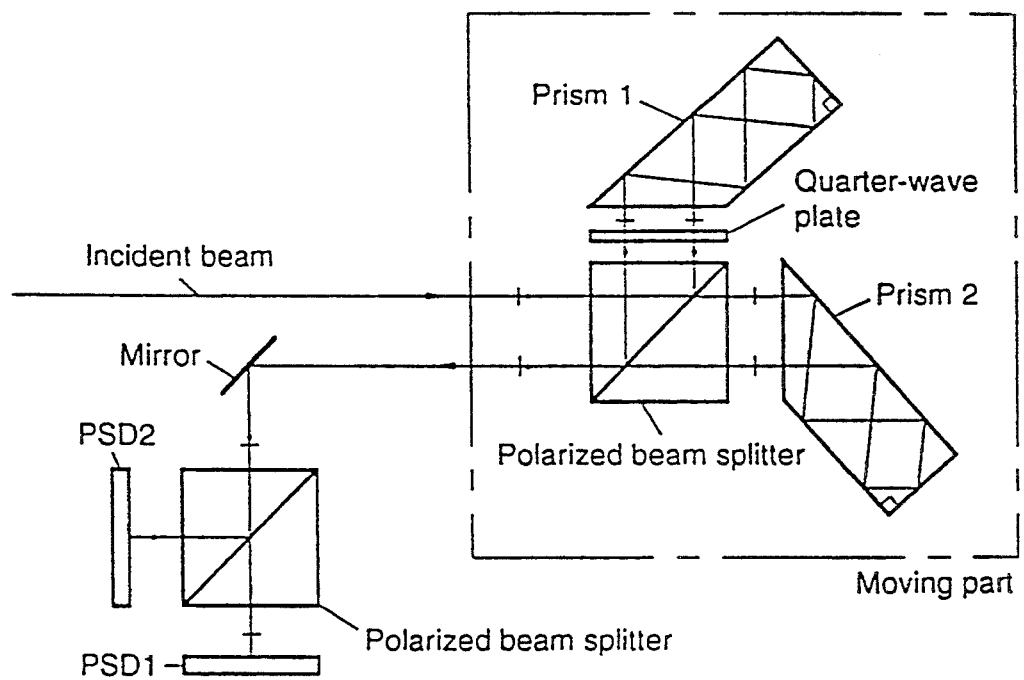
FIG. 27 illustrates the optical layout with multiple reflection prisms acting as retroreflectors.

The optical error measurement system may be modified into different configurations for other applications. In some applications the moving cable used with a measurement system mounted on the slide as above is not desirable. FIGS. 26 and 27 illustrate suitable modifications wherein the laser tube and PSDs are stationary. A linearly polarized beam is used as the light source and a polarized beam splitter is used to replace the non-polarizing beam splitter. Also, a half-wave plate is used to rotate the polarization state of one of the beams so that the beams have the same polarization state with respect to the two detection prisms, which is required by the angle measurement method.

For s-polarized light, the half wave plate is placed in front of Prism 1 and for p-polarized light, it is placed in front of Prism 2. The reflection prisms in these examples are used as retroreflectors. For the two reflections inside each prism, one is the same as the reflections in the above system with its reflectance being a function of the angle of incidence and the other is a total internal reflection with its reflectance being unity, the latter therefore having no effect on angle measurement. Thus, for angle measurement the physical principle remains the same. However, for straightness measurement, the signal is doubled by the retroreflection. The reflected beams are separated by another polarized beam splitter and are sensed by PSDs. As shown only the reflection prisms, the first polarized beam splitter and the half-wave plate are mounted on the slide and no moving cable is necessary. In FIG. 27 the prisms are multiple reflection retroreflectors to increase measurement sensitivity.

The retroreflector prisms of FIG. 26 as shown are right triangular to provide the partial and total reflectance described above. Right isosceles triangular prisms cocked in position to provide partial internal reflection of the incident beam and total internal reflection of the exiting beam may be substituted.

Test results of the new error measurement system show that with the new beam delivery system, the beam pointing stability is improved approximately two orders of magnitude. The use of this beam delivery system also has some other benefits, such as a flexible beam delivery with simple optics and simple beam splitting.

The prototype measurement system is designed with a measurement range of 100 arcsec for pitch and yaw measurement and 100 micrometers for straightness measurement. Experimental results show a resolution of 0.04 arcsec for pitch and yaw measurement and 0.04 micrometer for straightness measurement.

We claim:

1. In a multiple geometric error measurement system comprising a collimated laser light beam, a beam splitter positioned to intercept the beam and split the beam into a plurality of separate beams, a plurality of critical angle prisms each positioned to intercept a separate beam, a plurality of position-sensing detectors each positioned to intercept a separate beam exiting a critical angle prism, said position sensing detectors each providing position output signals, and means to process the plurality of output signals to calculate position error, and a laser light beam conditioning apparatus comprising an optical fiber coupler having means to focus a beam onto the end of an optical fiber, a single-mode optical fiber having cladding and a core, and one end of the core thereof positioned in the coupler to intercept the focused light beam, and an objective lens, said objective lens positioned to intercept a beam exiting the opposite end of the single-mode optical fiber whereby only a single-mode beam is triggered and passes through the fiber and objective lens.

2. A multiple geometric error measurement apparatus comprising a source of a collimated single-mode laser light beam, a beam splitter positioned to intercept the beam and split the beam into a plurality of separate beams, a plurality of critical angle prisms each positioned to intercept a separate beam, a plurality of position-sensing detectors each positioned to intercept a separate beam exiting a critical angle prism, said position sensing detectors each providing position output signals and light intensity signals, and means to process the plurality of position output signals and light intensity signals to calculate position error and angular error.

3. In a multiple geometric error measurement system comprising a collimated laser light beam, a beam splitter positioned to intercept the beam and split the beam into a plurality of separate beams, a plurality of critical angle prisms each positioned to intercept a separate beam, a plurality of light intensity detectors each positioned to intercept a separate beam exiting a critical angle prism, said light intensity detectors each providing light intensity output signals, and means to process the plurality of output signals to calculate angular error, and a laser light beam conditioning apparatus comprising an optical fiber coupler having means to focus a beam onto the end of an optical fiber, a single-mode optical fiber having cladding and a core, and one end of the core thereof positioned in the coupler to intercept the focused light beam, and an objective lens, said objective lens positioned to intercept a beam exiting the opposite end of the single-mode optical fiber whereby only a single-mode beam is triggered and passes through the fiber and objective lens.

* * * * *